(12) United States Patent
Cobb

(10) Patent No.: US 12,433,245 B2
(45) Date of Patent: Oct. 7, 2025

(54) AUTOMATIC HAY FEEDER DEVICE

(71) Applicant: Tyrus Cobb, Leon, WV (US)

(72) Inventor: Tyrus Cobb, Leon, WV (US)

( * ) Notice: Subject to any disclaimer, the term of this patent is extended or adjusted under 35 U.S.C. 154(b) by 0 days.

(21) Appl. No.: 18/353,374

(22) Filed: Jul. 17, 2023

(65) Prior Publication Data

US 2024/0122155 A1 Apr. 18, 2024

Related U.S. Application Data

(60) Provisional application No. 63/416,978, filed on Oct. 18, 2022.

(51) Int. Cl.
*A01K 1/10* (2006.01)

(52) U.S. Cl.
CPC ..................................... *A01K 1/10* (2013.01)

(58) Field of Classification Search
CPC ...... A01K 1/10; A01K 5/0107; A01K 5/0225; A01K 1/105; A01K 5/02; A01K 5/0208; A01K 5/0233; A01K 5/0275; A01K 5/0283; A01D 90/083; B65G 11/12; B65G 65/005; B65G 1/00; B65G 1/02; B65G 11/02; B65G 11/023; B65G 11/026
USPC .............. 198/524; 193/17, 18; 221/289, 295
See application file for complete search history.

(56) References Cited

U.S. PATENT DOCUMENTS

| | | | |
|---|---|---|---|
| 2,520,458 A * | 8/1950 | Doherty | A01D 85/005 56/473.5 |
| 3,866,529 A | 2/1975 | Holman | |
| 5,899,169 A | 5/1999 | Jenson | |
| 6,213,053 B1 * | 4/2001 | Lammers | A01K 5/0107 119/51.01 |
| 6,550,421 B1 | 4/2003 | Sturgis | |
| 2005/0281648 A1 | 12/2005 | Hockenyos | |
| 2007/0181069 A1 | 8/2007 | Jack | |
| 2015/0320013 A1 * | 11/2015 | Camilletti | A01K 5/01 119/58 |
| 2018/0288967 A1 | 10/2018 | Gagnon | |
| 2024/0107978 A1 * | 4/2024 | Moran | A01K 1/10 |

FOREIGN PATENT DOCUMENTS

CN 106416616 A * 2/2017

* cited by examiner

*Primary Examiner* — Joshua D Huson
*Assistant Examiner* — Brook Victoria Schmid
(74) *Attorney, Agent, or Firm* — Brennan, Manna & Diamond, LLC

(57) ABSTRACT

The present invention relates to an automatic hay feeder device. The device can be used with hay bales or other animal feed of the like and is comprised of a gravity fed feeder that is mobile and automatically feeds hay bales from a chute into the trailer body of the device for animal consumption. As a result, a farmer need not manually replenish hay bales on a regular basis.

4 Claims, 4 Drawing Sheets

AUTOMATIC HAY FEEDER DEVICE

CROSS-REFERENCE TO RELATED APPLICATION

The present application claims priority to, and the benefit of, U.S. Provisional Application No. 63/416,978, which was filed on Oct. 18, 2022, and is incorporated herein by reference in its entirety.

FIELD OF THE INVENTION

The present invention relates generally to the field of animal feeders. More specifically, the present invention relates to an automatic hay feeder device for hay bales or other animal feed of the like. The device is comprised of a gravity-fed feeder that is mobile and automatically feeds hay bales from a chute into the trailer body of the device for animal consumption. Accordingly, the present disclosure makes specific reference thereto. Nonetheless, it is to be appreciated that aspects of the present invention are also equally applicable to other like applications, devices, and methods of manufacture.

BACKGROUND

Hay feeders are used to feed farm animals such as cows, horses, and the like. Furthermore, farmers must manually refill feeders with new hay bales once the feeder is empty. If the feeders are not refilled daily, animals can go hungry and even become malnourished. However, filling feeders can be extremely time-consuming and require significant physical effort.

Therefore, there exists a long-felt need in the art for an improved hay feeding device. More specifically, there exists a long-felt need in the art for an automatic hay feeder device that does not require a farmer to manually refill a hay bale feeder. In addition, there exists a long-felt need in the art for an automatic hay feeder device that does not require a farmer to manually refill a hay bale feeder and that can be easily transported.

The subject matter disclosed and claimed herein, in one embodiment thereof, comprises an automatic hay feeder device. The device is primarily comprised of a trailer which is comprised of a frame with at least one trailer hitch, at least one side wall, at least one axle with at least one wheel, and a chute attached to the trailer via at least one hinge point comprised of at least one door with at least one spring-loaded return hinge. The chute receives a plurality of hay bales and is angled downward toward the trailer such that gravity rolls the hay bales into the trailer. In use, the first hay bale put into the trailer rests on a spring-loaded platform, wherein the second hay bale is stopped in the chute via the door. Once the first hay bale has been eaten, the platform raises which tightens a cable and allows the door to fall to release the second hay bale into the trailer. Once the second bale falls onto the platform and creates slack in the cable, the door is returned to an upright position to stop a third hay bale from entering the trailer via the spring-loaded return hinge.

In this manner, the automatic hay feeder device of the present invention accomplishes all the foregoing objectives and provides an improved hay feeding device. More specifically, the device does not require a farmer to manually refill a hay bale feeder via the gravity-fed nature of the device. In addition, the device can be easily transported as needed via the wheels and the hitch.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an automatic hay feeder device primarily comprised of a trailer which is comprised of a frame with at least one side wall, at least one axle with at least one wheel, and a chute attached to the trailer via at least one hinge point comprised of at least one door with at least one spring-loaded return hinge.

The device is comprised of a trailer body with a trailer frame that provides structural support to the body. The frame may be comprised of at least one male or female trailer hitch that allows the device to be towed by a tractor or other vehicle. This allows the device to be easily repositioned in various locations for livestock feeding. The frame is comprised of at least one axle with at least one wheel.

The trailer is comprised of at least one side wall. The side wall secures hay bales (or other similar baled feed of the like) within the trailer. The side wall is comprised of at least one opening that allows an animal to graze on the hay bale from outside the trailer.

The trailer is comprised of at least one (but preferably two) chutes. The chutes are half-cylindrical in shape and hold hay bales that are not yet meant to be consumed from the trailer. The chutes may attach to the side wall and/or frame via at least one hinge point. The chute may be supported during use and transported by at least one hydraulic support arm.

When deployed, the chute is sloped at a downward angle toward the trailer. To support the chute in this position, at least one vertical support arm may removably attach to the chute. The arm bears the weight of the chute, and the height of the arm ensures the chute remains sloped toward the trailer to allow the device to feed hay bales into the trailer via gravity.

As a result, the device functions as an automatic, gravity-fed feeder for livestock wherein a plurality of hay bales are loaded into the chute and wherein one hay bale (i.e., the first hay bale) falls down the chute and rests within the trailer on at least one platform. The platform is preferably a spring-loaded platform, wherein the weight of the hay bale on the platform lowers the platform to the floor of the trailer. As livestock animals consume the hay bale, the weight of the bale on the platform decreases, such that the platform raises above the floor via the spring action of the platform.

Once this begins to occur, at least one cable attached to the platform begins to tighten. The cable is also connected to at least one door positioned within the interior surface of the chute, preferably nearest the trailer. The door prevents a second hay bale from falling into the trailer until the first hay bale has been sufficiently eaten, such that the platform raises above the floor. Once this occurs, the cable is tightened which pulls the door downward to allow the second bale to fall onto the platform (on top of the partially or fully eaten first hay bale) for consumption. In this manner, the device automatically feeds new hay bales onto the platform as needed, based on the consumption of the prior bale by livestock. Once the second bale has rolled down the chute into the trailer, the platform is once again depressed by the weight of the bale, such that the cable has slack which allows the door to return to an upright state via at least one spring-loaded return hinge. In this manner, the door prevents a third hay bale from falling into the trailer until the second bale has been consumed enough to raise the platform and thus repeating the hay bale replenishing process.

The present invention is also comprised of a method of using the device. First, a device is provided comprised of a trailer which is comprised of a frame with at least one side wall, at least one axle with at least one wheel, and at least one platform, at least one chute attached to the trailer via at least one hinge point comprised of at least one door with at least one spring-loaded return hinge, and at least one vertical support arm. Then, the chute is positioned such that a far end of the chute is higher than the side wall of the trailer to allow the chute to be angled downward toward the trailer. Then, a first hay bale is placed within the trailer on top of the platform and a second hay bale is placed in the chute behind the door of the chute.

Accordingly, the automatic hay feeder device of the present invention is particularly advantageous as it provides an improved hay feeding device. More specifically, the device does not require a farmer to manually refill a hay bale feeder and instead, uses gravity. In addition, the device can be easily transported via the wheels and hitch. In this manner, the automatic hay feeder device overcomes the limitations of existing hay feeding devices known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
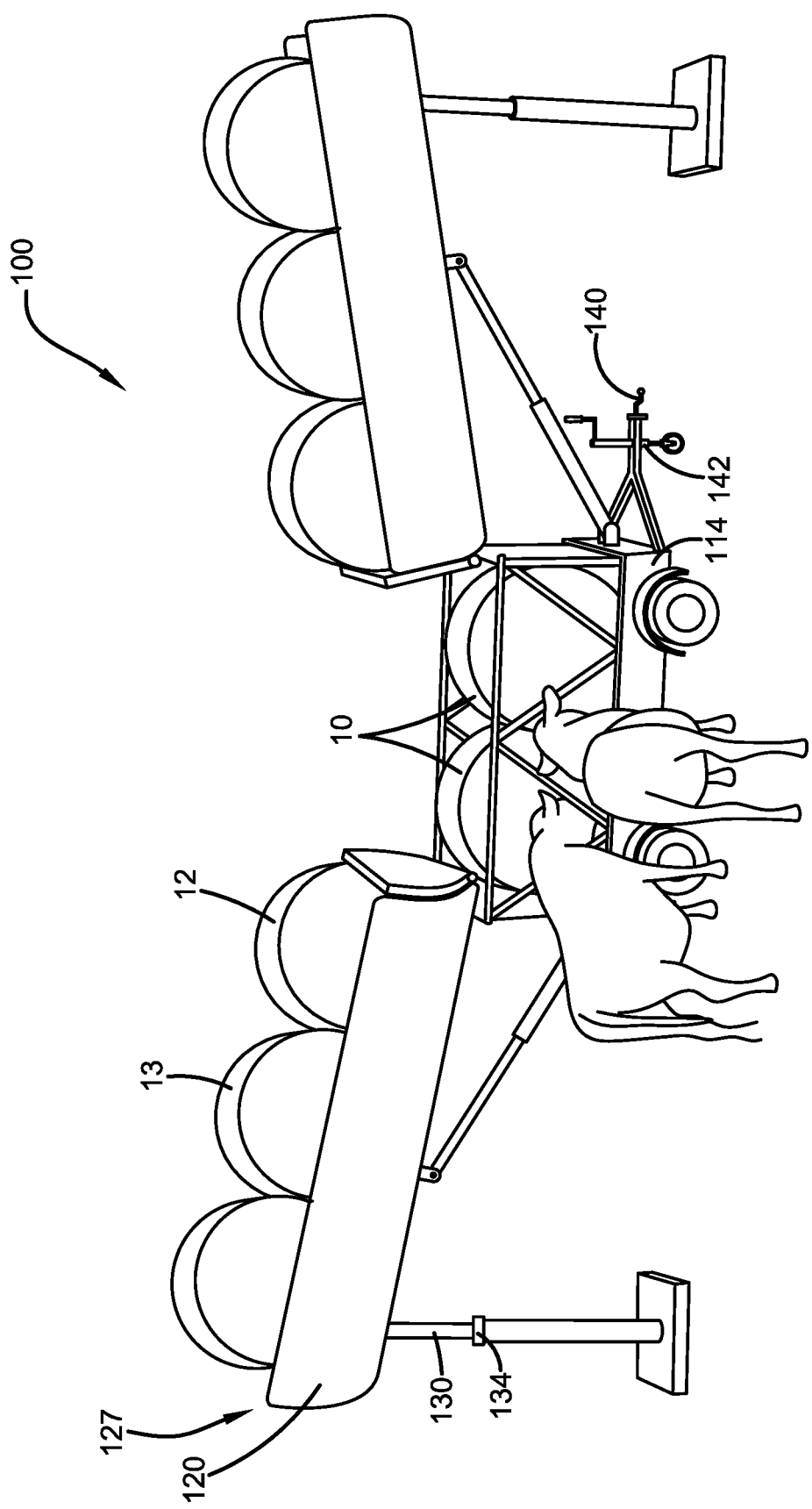
FIG. 1 illustrates a perspective view of one potential embodiment of an automatic hay feeder device of the present invention while loaded with hay bales in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for an improved hay feeding device. More specifically, there exists a long-felt need in the art for an automatic hay feeder device that does not require a farmer to manually refill a hay bale feeder. In addition, there exists a long-felt need in the art for an automatic hay feeder device that does not require a farmer to manually refill a hay bale feeder and that can be easily transported.

The present invention, in one exemplary embodiment, is comprised of an automatic hay feeder device primarily comprised of a trailer which is comprised of a frame with at least one side wall, at least one axle with at least one wheel, and a chute attached to the trailer via at least one hinge point comprised of at least one door with at least one spring-loaded return hinge.

The device is comprised of a trailer body with a trailer frame that provides structural support to the body. The frame may be comprised of at least one male or female trailer hitch that allows the device to be towed by a tractor or other vehicle to allow the device to be easily repositioned in various locations for livestock feeding. The frame is comprised of at least one axle with at least one wheel. The trailer is comprised of at least one side wall that secures hay bales (or other similar baled feed of the like) within the trailer. The side wall is comprised of at least one opening that allows an animal to graze on the hay bale from outside the trailer.

The trailer is comprised of at least one (but preferably two) chute. The chute is half-cylindrical in shape and holds hay bales that are not yet meant to be consumed from the trailer. The chute may attach to the side wall and/or frame via at least one hinge point. The chute may be supported during use and transported by at least one hydraulic support arm. When deployed, the chute is sloped at a downward angle towards the trailer. To support the chute in this position, at least one vertical support arm may removably attach to the chute that bears weight of the chute and wherein the height of the arm ensures the chute remains sloped towards the trailer to allow the device to feed hay bales into the trailer via gravity.

As a result, the device functions as an automatic, gravity-fed feeder for livestock, wherein a plurality of hay bales are loaded into the chute and wherein one hay bale (i.e., the first hay bale) falls down the chute and rests within the trailer on at least one platform. The platform is preferably a spring-loaded platform, wherein the weight of the hay bale on the platform lowers the platform to the floor of the trailer. As livestock animals consume the hay bale, the weight of the bale on the platform decreases such that the platform raises above the floor via the spring action of the platform.

Once this begins to occur, at least one cable attached to the platform begins to tighten. The cable is also connected to at least one door positioned within the interior surface of the chute, preferably nearest the trailer, that prevents a second hay bale from falling into the trailer until the first hay bale has been sufficiently eaten, such that the platform raises above the floor. Once this occurs, the cable is tightened which pulls the door downward to allow the second bale to fall onto the platform (on top of the partially or fully eaten first hay bale) for consumption. In this manner, the device automatically feeds new hay bales onto the platform as needed, based on the consumption of the prior bale by livestock. Once the second bale has rolled down the chute into the trailer, the platform is once again depressed by the weight of the bale, such that the cable has slack which allows the door to return to an upright state via at least one spring-loaded return hinge. In this manner, the door prevents a third hay bale from falling into the trailer until the second bale has been consumed enough to raise the platform and thus repeating the hay bale replenishing process.

The present invention is also comprised of a method of using the device. First, a device is provided comprised of a trailer which is comprised of a frame with at least one side wall, at least one axle with at least one wheel, and at least one platform, at least one chute attached to the trailer via at least one hinge point comprised of at least one door with at least one spring-loaded return hinge, and at least one vertical support arm. Then, the chute is positioned such that a far end of the chute is higher than the side wall of the trailer to allow the chute to be angled downward toward the trailer. Then, a first hay bale is placed within the trailer on top of the platform and a second hay bale is placed in the chute behind the door of the chute.

Accordingly, the automatic hay feeder device of the present invention is particularly advantageous as it provides an improved hay feeding device. More specifically, the device does not require a farmer to manually refill a hay bale feeder and instead, uses gravity. In addition, the device can be easily transported via the wheels and hitch. In this manner, the automatic hay feeder device overcomes the limitations of existing hay feeding devices known in the art.

Referring initially to the drawings, FIG. 1 illustrates a perspective view of one potential embodiment of an automatic hay feeder device 100 of the present invention while loaded with hay bales 10,12,13 in accordance with the disclosed architecture. The device 100 is primarily comprised of a trailer 110 which is comprised of a frame 114 with at least one side wall 112, at least one axle 116 with at least one wheel 118, and a chute 120 attached to the trailer 110 via at least one hinge point 121 comprised of at least one door 124 with at least one spring-loaded return hinge 125.

The device 100 is comprised of a trailer body 110. The trailer body 110 is comprised of at least one trailer frame 114 that provides structural support to the body 110. The frame 114 may be comprised of at least one male or female trailer hitch 142 that allows the device 100 to be towed by a tractor or other vehicle. This allows the device 100 to be easily repositioned in various locations for livestock feeding. When not attached to a vehicle or tractor, the trailer 110 is supported by at least one height-adjustable trailer leg 140 (of any type of trailer leg/trailer wheel known in the art).

The frame 114 is comprised of at least one axle 116 with at least one wheel 118. The trailer 110 preferably has two axles 116, each with two wheels 118. The wheels 118 may be any wheel type known in the art. The wheels 118 allow the trailer 110 to be moved as needed.

The trailer 110 is comprised of at least one side wall 112. The side wall 112 secures hay bales 10 (or other similar feed bales of the like) within the trailer 110. The side wall 112 is comprised of at least one opening 113 that allows an animal to graze on the hay bale 10 from outside the trailer 110. In one embodiment, the trailer 110 has a plurality of side walls 112 in the form of horizontal bars. However, the side walls 112 may be any size, shape, and arrangement in different embodiments so long as they allow an animal to graze on the hay bale 10 from outside the trailer 110.

The trailer 110 is comprised of at least one (but preferably two) chute 120. The chute 120 is half-cylindrical in shape and holds hay bales 10 that are not yet meant to be consumed from the trailer 110. The chute 120 may attach to the side wall 112 and/or frame 114 via at least one hinge point 121. The hinge point 121 may be any hydraulic hinge or other hinge type known in the art. The hinge point 121 allows the chute 120 to be folded upward or downward when not in use to allow the device 100 to be easily transported. In one embodiment, the chute 120 may be telescopic, such that it can be easily collapsed for transport/storage.

Figure 2:
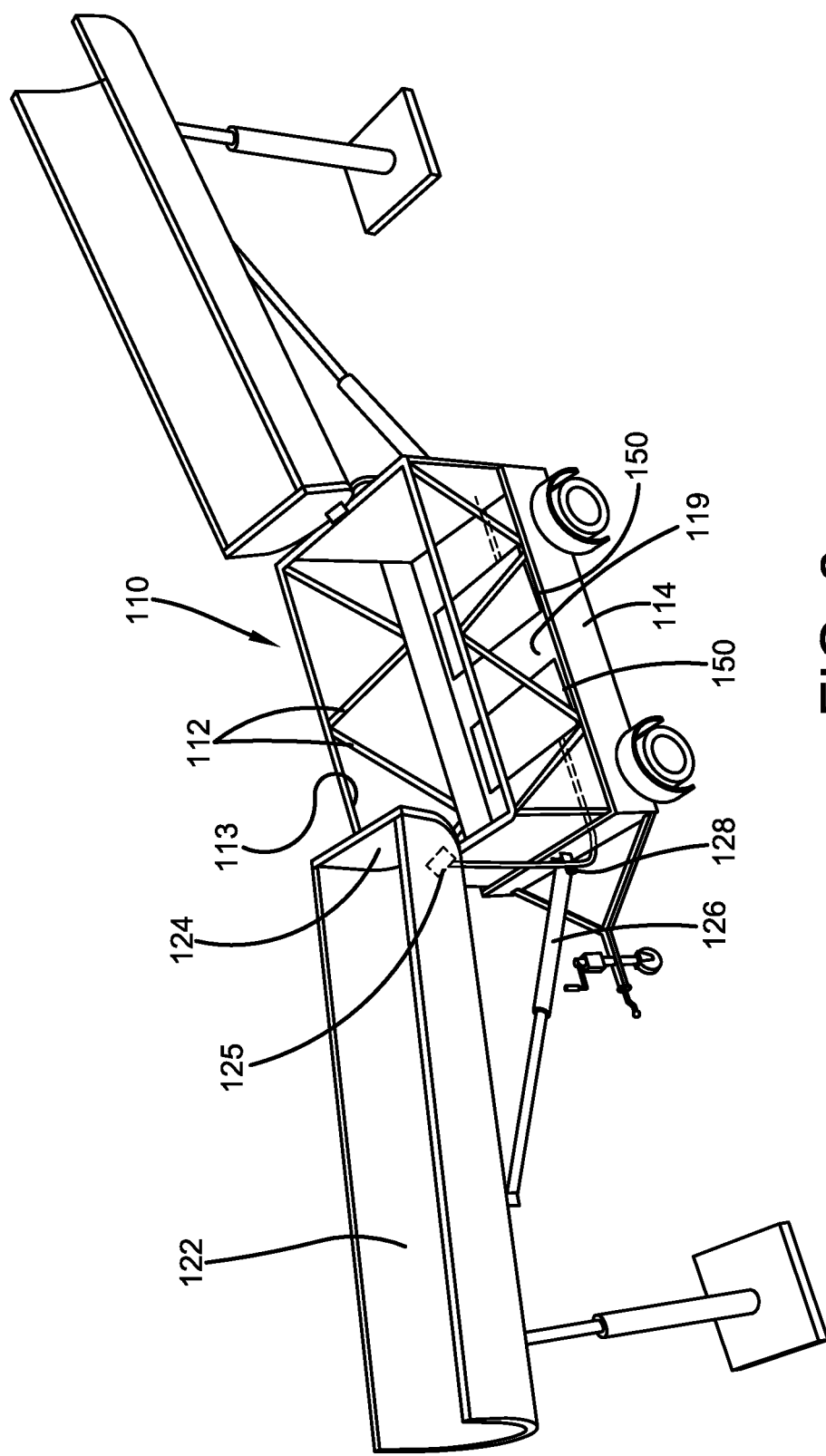
FIG. 2 illustrates a perspective view of one potential embodiment of an automatic hay feeder device of the present invention in accordance with the disclosed architecture.

The chute 120 may be supported during use and transported by at least one hydraulic support arm 126, as seen in FIG. 2. The arm 126 attaches to the frame 114 and/or side wall 112 via at least one pivot point 128 such as, but not limited to, a hinge that allows the arm 126 to move as the angle of the chute 120 changes.

When deployed, the chute 120 is sloped at a downward angle toward the trailer 110 (i.e., the far end 127 of the chute 120 is higher than the side wall 112). To support the chute 120 in this position, at least one vertical support arm 130 may removably attach to the chute 120. The arm 130 is preferably (but not limited to) a hydraulic arm that is height adjustable. The height of the arm 130 may be secured via at least one locking mechanism 134 of any type known in the art. The arm 130 is comprised of at least one base 132 that provides support and stability to the arm 130. The arm 130 bears the weight of the chute 120 and the height of the arm 130 ensures the chute 120 remains sloped toward the trailer 110 to allow the device 100 to feed hay bales 12,13 into the trailer 110 via gravity. The arm 130 is preferably removably attached to the chute 120 via at least one fastener 129 such as, but not limited to, a pin to allow the arm 130 to be removed during transport of the device 100.

Figure 3:
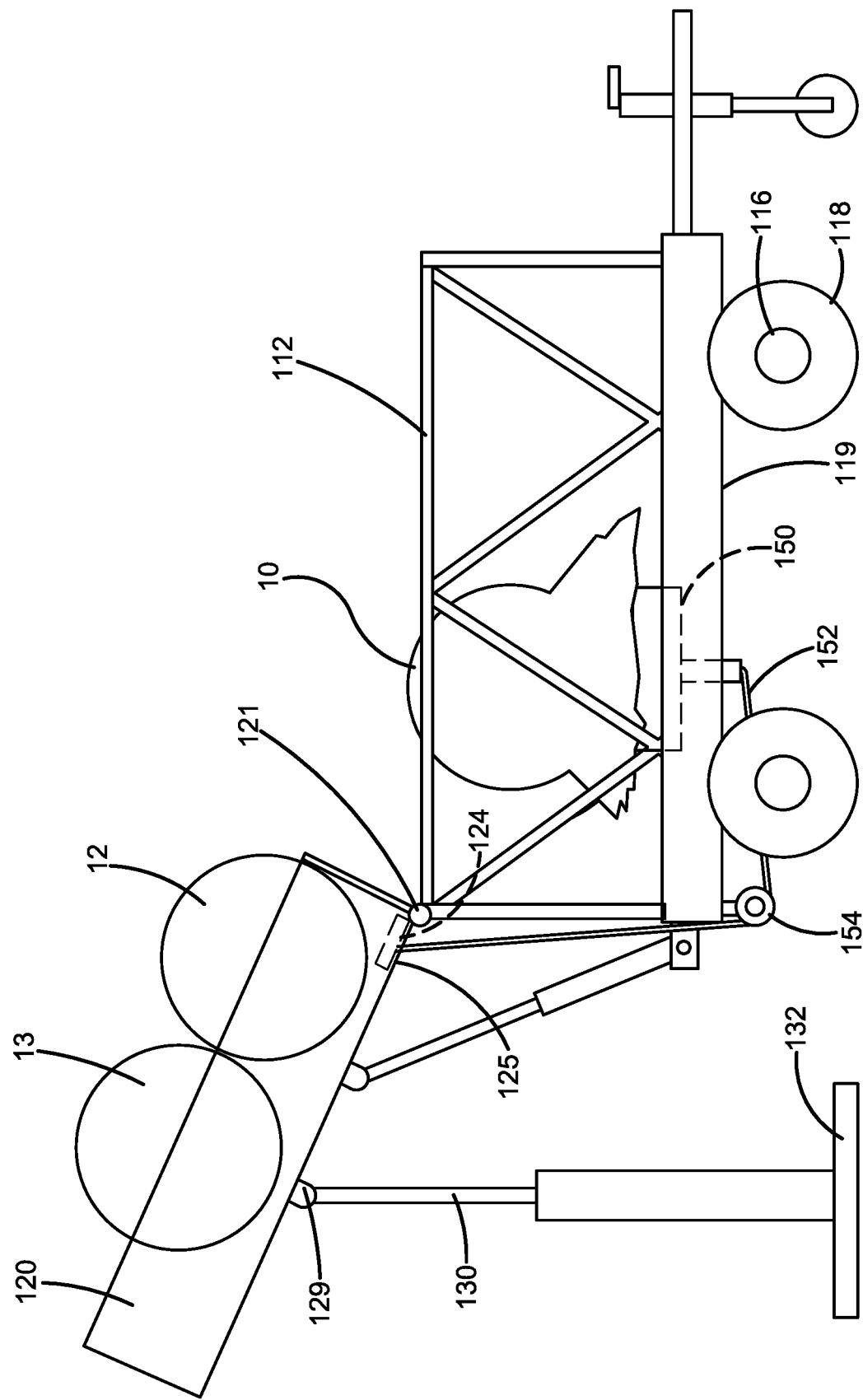
FIG. 3 illustrates a side view of one potential embodiment of an automatic hay feeder device of the present invention while loaded with hay bales in accordance with the disclosed architecture.

The device 100 functions as an automatic, gravity-fed feeder for livestock. During use, a plurality of hay bales 10,12,13 are loaded into the chute 120, wherein one hay bale 10 (i.e., the first hay bale) falls down the chute 120 and rests within the trailer 110 on at least one platform 150, as seen in FIG. 3. The platform 150 is preferably a spring-loaded platform, wherein the weight of the hay bale 10 on the platform 150 lowers the platform 150 to the floor 119 of the trailer 110.

As livestock animals consume the hay bale 10, the weight of the bale 10 on the platform decreases. As the weight decreases, the platform 150 raises above the floor 119 via the spring action of the platform 150. Once this begins to occur, at least one cable 152 attached to the platform 150 begins to tighten. The cable 152 may be supported by at least one pulley wheel 154 or other similar structure of the like. The cable 152 is also connected to at least one door 124 positioned within the interior surface 122 of the chute 120, preferably nearest the trailer 110. The door 124 prevents a second hay bale 12 from falling into the trailer 110 until the first hay bale 10 has been sufficiently eaten, such that the platform 150 raises above the floor 119. Once this occurs, the cable 152 is tightened which pulls the door 124 downward to allow the second bale 12 to fall onto the platform 150 (on top of the partially or fully eaten first hay bale 10) for consumption. In this manner, the device 100 automatically feeds new hay bales 12 onto the platform as needed based on the consumption of the prior bale 10 by livestock.

Once the second bale 12 has rolled down the chute 120 into the trailer 110, the platform 150 is once again depressed by the weight of the bale 12 such that the cable 152 has slack. The presence of slack in the cable 152 allows the door 124 to return to an upright state via at least one spring-loaded return hinge 125. In this manner, the door 124 prevents a third hay bale 13 from falling into the trailer 110 until the second bale 12 has been consumed enough to raise the platform 150 and thus, repeating the hay bale replenishing process described supra.

In one embodiment, the device 100 may have no platform 150, cable 152, and door 124 and instead, allows gravity and the natural consumption of the first bale 10 to allow the second bale 12, third bale 13, etc., to fall into the trailer 10 for consumption.

Figure 4:
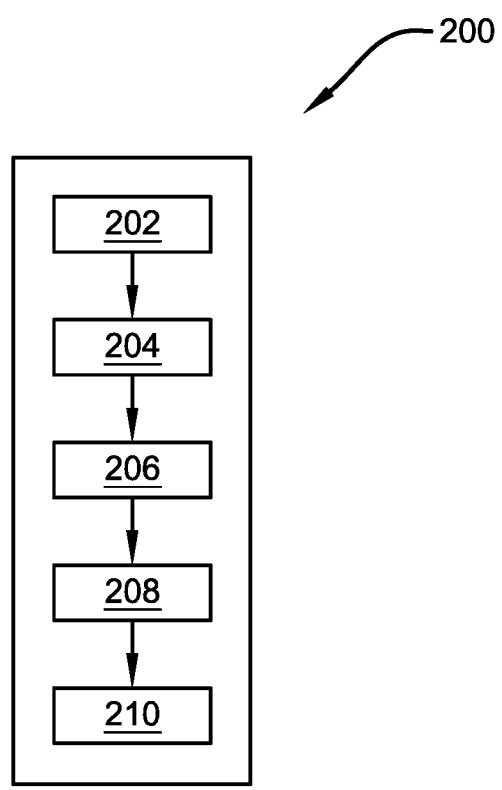
FIG. 4 illustrates a flowchart of a method of using one potential embodiment of an automatic hay feeder device of the present invention in accordance with the disclosed architecture.

The present invention is also comprised of a method of using 200 the device 100, as seen in FIG. 4. First, a device 100 is provided which is comprised of a trailer 110 comprised of a frame 114 with at least one side wall 112, at least one axle 116 with at least one wheel 118, and at least one platform 150, at least one chute 120 attached to the trailer 110 via at least one hinge point 121 comprised of at least one door 124 with at least one spring-loaded return hinge 125, and at least one vertical support arm 130 [Step 202]. Then, the chute 120 is positioned such that a far end 127 of the chute 110 is higher than the side wall 112 of the trailer to allow the chute 120 to be angled downward toward the trailer 110 [Step 204]. Next, the vertical support 130 is attached to the chute 120 via at least one fastener 129 [Step 206]. Then, a first hay bale 10 is placed within the trailer 110 on top of the platform 150 [Step 208]. Then, a second hay bale 12 is placed in the chute 120 behind the door 124 of the chute 120 [Step 210].

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "automatic hay feeder device" and "device" are interchangeable and refer to the automatic hay feeder device 100 of the present invention.

Notwithstanding the foregoing, the automatic hay feeder device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the automatic hay feeder device 100 as shown in the FIGS. are for illustrative purposes only, and that many other sizes and shapes of the automatic hay feeder device 100 are well within the scope of the present disclosure. Although the dimensions of the automatic hay feeder device 100 are important design parameters for user convenience, the automatic hay feeder device 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An automatic hay feeder device comprising:
   a trailer comprised of a floor, a side wall, a wheel, and a platform positioned on the floor;
   a chute attached to the trailer, the chute comprised of a door having a return hinge;
   a cable attached to the door and the platform;
   a vertical support attached to the chute; and
   wherein the platform is comprised of a spring-loaded platform.

2. An automatic hay feeder device comprising:
   a trailer comprised of a floor, a side wall, a wheel, and a platform positioned on the floor;
   a chute attached to the trailer, the chute comprised of a door having a return hinge;
   a cable attached to the door and the platform;
   a vertical support attached to the chute; and
   wherein the chute attaches to the trailer via a hinge point.

3. An automatic hay feeder device comprising:
   a trailer comprised of a floor, a side wall, a wheel, and a platform positioned on the floor;
   a chute attached to the trailer, the chute comprised of a door having a spring-loaded return hinge;
   a vertical support arm attached to the chute;
   a cable attached to the door and the platform;
   a hydraulic support arm; and
   wherein the platform is comprised of a spring-loaded platform.

4. An automatic hay feeder device comprising:
   a trailer comprised of a floor, a side wall, a wheel, and a platform positioned on the floor;
   a chute attached to the trailer, the chute comprised of a door having a spring-loaded return hinge:
   a vertical support arm attached to the chute;
   a cable attached to the door and the platform;
   a hydraulic support arm; and
   wherein the chute attaches to the trailer via a first hinge.

* * * * *